United States Patent
Tatsuta et al.

(10) Patent No.: US 10,324,295 B2
(45) Date of Patent: Jun. 18, 2019

(54) EYEGLASS-TYPE DISPLAY APPARATUS

(71) Applicant: OLYMPUS CORPORATION, Tokyo (JP)

(72) Inventors: Seiji Tatsuta, Hachioji (JP); Yoichi Iba, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/726,979

(22) Filed: Oct. 6, 2017

(65) Prior Publication Data

US 2018/0031847 A1    Feb. 1, 2018

Related U.S. Application Data

(63) Continuation of application No. PCT/JP2015/001965, filed on Apr. 7, 2015.

(51) Int. Cl.
*G02B 27/01* (2006.01)
*H04N 5/74* (2006.01)
*H04N 5/64* (2006.01)

(52) U.S. Cl.
CPC ..... *G02B 27/0176* (2013.01); *G02B 27/0172* (2013.01); *G02B 27/0179* (2013.01); *H04N 5/7491* (2013.01); *G02B 2027/0178* (2013.01); *H04N 5/64* (2013.01)

(58) Field of Classification Search
CPC ............ G02B 27/0176; G02B 27/0179; G02B 2027/0178; G02B 27/0149; G02B 2027/0154; G02B 2027/0158; G02B 2027/0159; H04N 5/7491; H04N 13/332

USPC .................................. 359/632; 351/115, 120
See application file for complete search history.

(56) References Cited

U.S. PATENT DOCUMENTS

| | | | | |
|---|---|---|---|---|
| 9,897,813 | B2* | 2/2018 | Mirza | G02B 27/0179 |
| 2004/0113867 | A1 | 6/2004 | Tomine et al. | |
| 2011/0050655 | A1* | 3/2011 | Mukawa | G02B 27/0172 |
| | | | | 345/204 |

FOREIGN PATENT DOCUMENTS

| | | | |
|---|---|---|---|
| JP | 4440878 | B2 | 3/2010 |
| JP | 2010-74220 | A | 4/2010 |
| JP | 2010074220 | A * | 4/2010 |
| JP | 2011-70141 | A | 4/2011 |
| JP | 2013-211811 | A | 10/2013 |
| JP | 2013-214910 | A | 10/2013 |

OTHER PUBLICATIONS

International Search Report dated Jul. 7, 2015 issued in PCT/JP2015/001965.

* cited by examiner

*Primary Examiner* — Ryan D Howard
(74) *Attorney, Agent, or Firm* — Scully, Scott, Murphy & Presser, P.C.

(57) ABSTRACT

An eyeglass-type display apparatus includes an eyeglass-front to be placed in front of the eyes of a user, left and right temples connected to the eyeglass-front and worn on the head of the user, a connector that adjusts the inclination of the eyeglass-front by rotating the eyeglass-front relative to the left and right temples, and an image display unit that is fixed to the eyeglass-front and projects image light onto an eyeball of the user. An axis of rotation of the connector is positioned on the eyeglass-front side of the center of the user's eyeball as viewed from the side.

6 Claims, 21 Drawing Sheets

EYEGLASS-TYPE DISPLAY APPARATUS

CROSS-REFERENCE TO RELATED APPLICATION

The present application is a Continuing Application based on International Application PCT/JP2015/001965 filed on Apr. 7, 2015, the entire disclosure of which is incorporated herein by reference.

TECHNICAL FIELD

This disclosure relates to an eyeglass-type display apparatus worn on the head.

BACKGROUND

Development of eyeglass-type display apparatuses in which a compact display apparatus embedded in an eyeglasses frame projects an image into the user's field of vision is progressing (for example, see patent literature PTL 1 to 3). For example, in the eyeglass-type display apparatus disclosed in PTL 1, an eyepiece for projecting an image is provided on the lower rim of an eyeglasses frame, and the user can observe an image only when looking at the eyepiece. The eyeglass-type display apparatus does not require a complicated wearing mechanism and can be worn on the user's head in the same way as regular eyeglasses.

For the eyeglass-type display apparatus to project an image onto the user's eyeball, a compact image display unit that does not block the user's peripheral vision is used, unlike a helmet-type or goggle-type head-mounted display device. When using such a compact image display unit, the area in which the user can see the image well (eye box) inevitably decreases. In a typical eyeglass-type display apparatus, the image therefore becomes harder to see if the position of the eyeglasses shifts even just a few millimeters. On the other hand, users exhibit individual variation in head size, position and shape of the nose and ears, and the like. Therefore, an adjustment mechanism for precise alignment (position adjustment) is necessary in an eyeglass-type image display apparatus so that, in accordance with individual differences, the position of the user's eye falls within the area in which the image can be seen.

For example, in the eyeglass-type image display apparatus disclosed in PTL 2, the front portion of the eyeglasses frame where the display is provided (eyeglass-front) is configured to allow rotational adjustment about an axis of rotation at the eyeball center as viewed from the side and allows the angle of incidence of the image to be adjusted with respect to the eyeball. In the eyeglass-type image display apparatus disclosed in PTL 3, a position adjuster is provided to allow the user to adjust the nose pads.

CITATION LIST

Patent Literature

PTL 1: JP 4440878 B2
PTL 2: JP 2013-214910 A
PTL 3: JP 2013-211811 A

SUMMARY

An eyeglass-type display apparatus according to this disclosure includes:
an eyeglass-front to be placed in front of eyes of a user;
left and right temples connected to the eyeglass-front and worn on a head of the user;
an angle adjuster configured to adjust inclination of the eyeglass-front by rotating the eyeglass-front relative to the left and right temples; and
an image display unit fixed to the eyeglass-front and configured to project image light onto an eyeball of the user; wherein
an axis of rotation of the angle adjuster is positioned on the eyeglass-front side of a center of the eyeball of the user as viewed from a side.

The eyeglass-front may include a rim, and the image display unit may be disposed on a side of the rim facing the user.

The axis of rotation of the angle adjuster may be positioned near the image display unit as viewed from a side.

The left and right temples may be expandable and contractible.

The eyeglass-type display apparatus may further include a nose pad to abut a nose of the user, and a height position adjustment mechanism configured to adjust a height position of the nose pad relative to the eyeglass-front.

The eyeglass-front refers to the portion at the front of the eyeglasses and includes a frame and/or lens and the like on the front side of the eyeglasses. "Near the image display unit" refers to the distance from the image light emitting portion of the image display unit being 12 mm or less.

BRIEF DESCRIPTION OF THE DRAWINGS

In the accompanying drawings:

FIG. 2A is a top view, and FIG. 2B is a side view;

DETAILED DESCRIPTION

Embodiments of this disclosure are described below with reference to the drawings.

Embodiment 1

Figure 1:
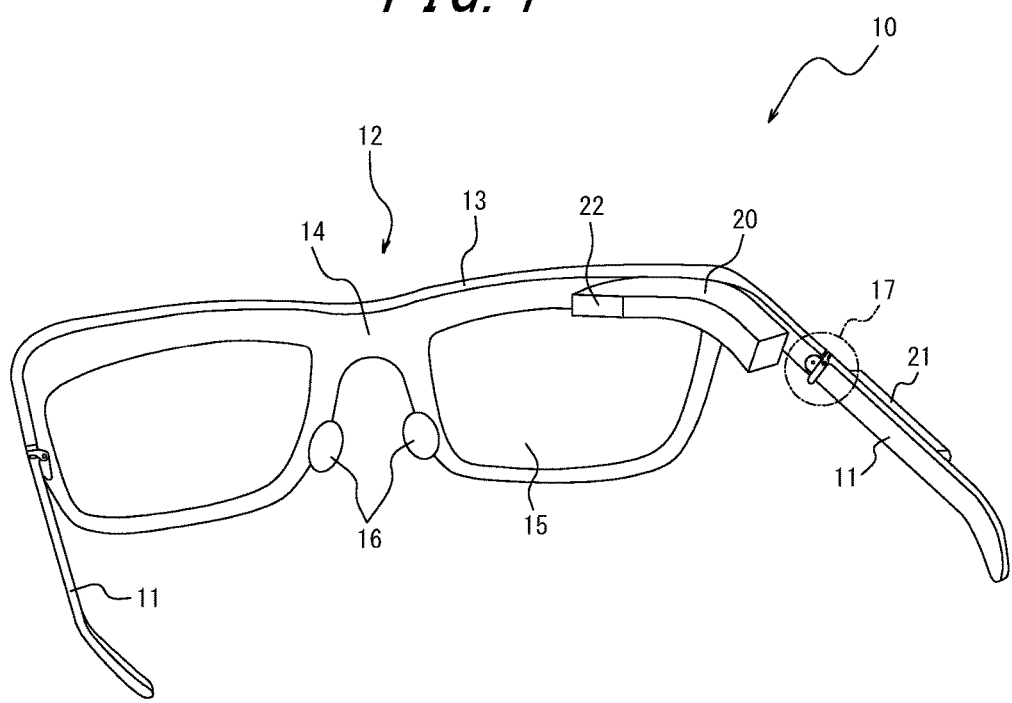
FIG. 1 is a perspective view of an eyeglass-type display apparatus according to Embodiment 1.

FIG. 1 is a perspective view of an eyeglass-type display apparatus 10 according to Embodiment 1 of this disclosure as seen from the back side of the eyeglasses. The eyeglass-type display apparatus 10 includes an eyeglasses portion, configured to include left and right temples 11 and an eyeglass-front 12, and an image display unit 20. The temples 11 are for wearing the eyeglass-type display apparatus 10 by hooking the eyeglass-type display apparatus 10 on the user's ears, as with ordinary eyeglasses. The eyeglass-front 12 is the portion at the front of the eyeglasses, disposed in front of the user's eyes, and includes left and right rims 13, a bridge 14, left and right lenses 15, and left and right nose pads 16. The left and right rims 13 respectively surround and hold the left and right lenses 15. The bridge 14 is positioned at the center of the left and right rims 13 that surround the left and right lenses 15 and connects the left and right rims 13. The nose pads 16 are provided at a portion of the left and right rims 13 that abuts the user's nose. When the eyeglass-type display apparatus 10 is worn, the side facing forward is referred to below as the front side, and the side facing the user's face is referred to below as the back side. The terms up down, right, left, horizontal, vertical, and the like indicate the directions when the user is wearing the eyeglass-type display apparatus 10.

The image display unit 20 is provided on the upper rim 13 of one lens 15 (the right lens in FIG. 1). The image display unit 20 can be formed integrally with the rim 13. A non-illustrated display element, such as an LCD or an organic EL display, is embedded and fixed in the image display unit 20. The image display unit 20 guides image light from the image of the display element with an internal optical system and projects the image light toward the user's eyeball from an eyepiece optical unit 22 configured by an eyepiece or the like disposed at the upper central portion of one lens 15. As a result, the user can observe an image displayed on the display element as a virtual image. The image display unit 20 is disposed at the back side of the rim 13 so as not to be visible from the front. Consequently, the eyeglass-type display apparatus 10 is nearly indistinguishable from regular glasses when worn.

Image data displayed on the display element in the image display unit 20 are supplied over a flexible wire (not displayed) from a signal processor 21 mounted in the temple 11. Transmission of image data is not limited to this example. Image data may be transmitted to the image display unit 20 by a wired or wireless communication interface from a mobile information terminal, such as a cellular phone, in the user's possession. In this case, the signal processor 21 need not be provided.

Figure 2A:
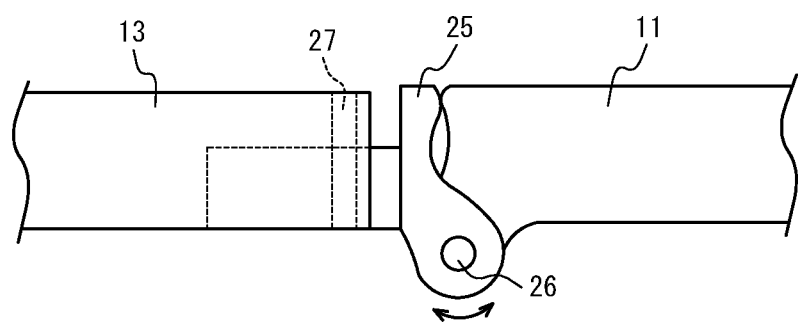
FIGS. 2A and 2B illustrate the configuration of the connector between the eyeglass-front and the temple of FIG. 1, where
Figure 2B:
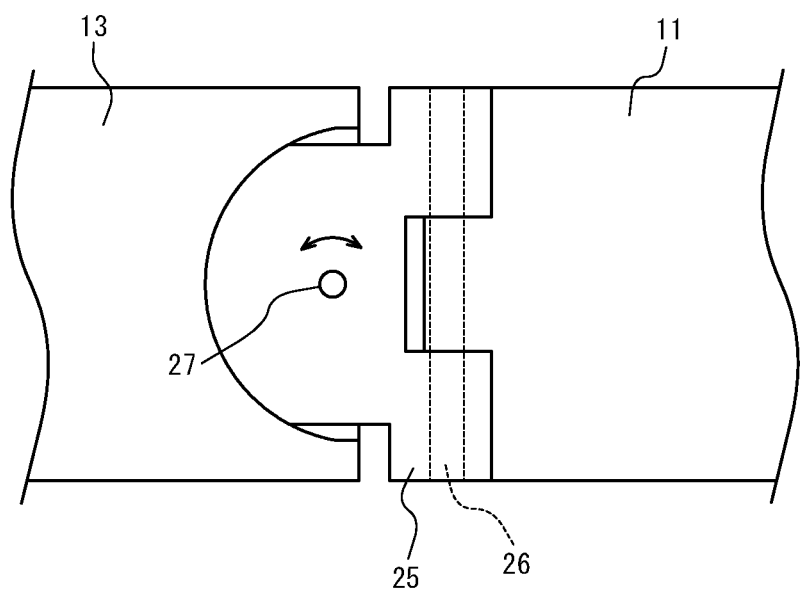

Next, the form of connection between the rim 13 of the eyeglass-front 12 and the left and right temples 11 is described. The rim 13 is connected to each temple 11 by a connector 17. FIGS. 2A and 2B illustrate the configuration of the connector 17, where FIG. 2A is a top view, and FIG. 2B is a side view as seen from the side contacting the user during wearing. The rim 13 is connected to each temple 11 with an intermediate member 25 therebetween. The intermediate member 25 and the rim 13 are connected by a hinge with a hinge shaft 26, like the connection between the rim and temple in regular glasses. The hinge shaft 26 extends vertically and allows the temple 11 of the eyeglass-type display apparatus 10 to bend horizontally. By the hinge shaft 26 being provided further back than the below-described rotating shaft 27, the temple 11 and eyeglass-front 12 tend not to interfere with each other at the time of folding, yielding an easy-to-fold structure.

The connection between the rim 13 and the intermediate member 25 is configured to allow inclination of the eyeglass-front 12 with respect to the temple 11. Details are provided below. A semi-circular arc-shaped notch with a predetermined thickness is formed at the end of the rim 13 at the intermediate member 25 side, on the surface facing the user. On the other hand, the end of the intermediate member 25 at the rim 13 side has a plate-shaped portion with an arc having approximately the same radius as the notch in the rim 13. This arc is fit slidably into the notch of the rim 13. In the intermediate member 25, the center of the arc is pivotally supported by the rotating shaft 27 (the axis of rotation), which is a pin or the like, with respect to the rim 13. Since the rotating shaft 27 extends horizontally, the rim 13 is supported to be rotatable in the vertical direction with respect to the intermediate member 25. The orientations of the rim 13 and the intermediate member 25 with respect to each other are supported by an appropriate friction force or the like therebetween. In this way, the connecting portion between the rim 13 and the intermediate member 25 constitutes an angle adjuster.

Figure 3:
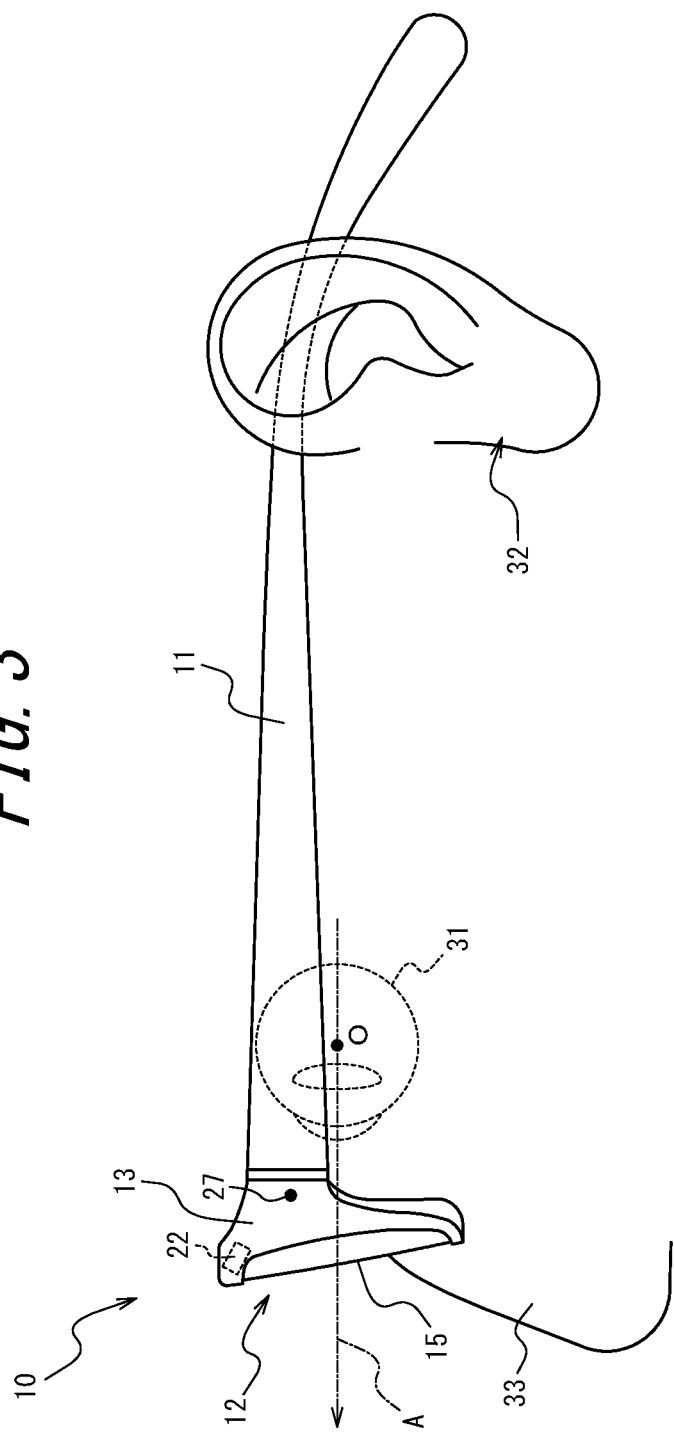
FIG. 3 illustrates the state of a user wearing the eyeglass-type display apparatus in FIG. 1.

FIG. 3 illustrates the state of a user wearing the eyeglass-type display apparatus 10 in FIG. 1. The user wears the eyeglass-type display apparatus 10 by hooking the back of the temples 11 on the ears 32 and placing the nose pads of the eyeglass-front 12 (not illustrated in FIG. 3) in contact with the nose 33. At this time, the rotating shaft 27 is positioned on the eyeglass-front 12 side of the user's eyeball center O. The rotating shaft 27 is particularly preferably positioned near the eyepiece optical unit 22 as viewed from the side. "Near the eyepiece optical unit 22" refers to the distance from the eyepiece optical unit 22 as viewed from the side being 12 mm or less. In general, the distance between the eyeglass lenses and the eyeball 31 is approximately 12 mm, and the radius of a human eyeball is also approximately 12 mm. If the rotating shaft 27 of the angle adjuster matches the eyeball center O as viewed from the side, then alignment is not possible, since light rays along the optical axis of the image light emitted from the eyepiece optical unit (emitted light rays) do not pass through the eyeball center O even if the eyeglass-front 12 is rotated. Conversely, if the distance between the rotating shaft 27 and the eyepiece optical unit 22 is smaller than 12 mm, which is half of the distance of 24 mm from the lens to the eyeball center O, the effect of position adjustment by rotation is thought to be large.

Figure 4:
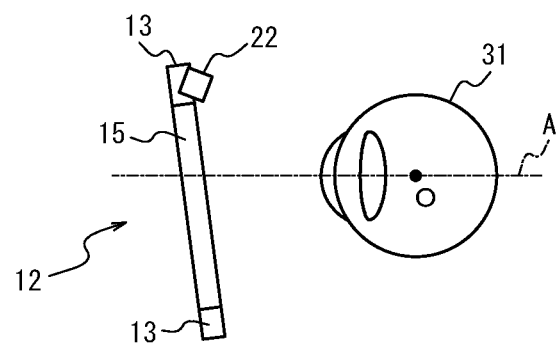
FIG. 4 illustrates the relationship in terms of position and orientation between the eyeglass-front and the eyeball when viewed from the front.
Figure 5:
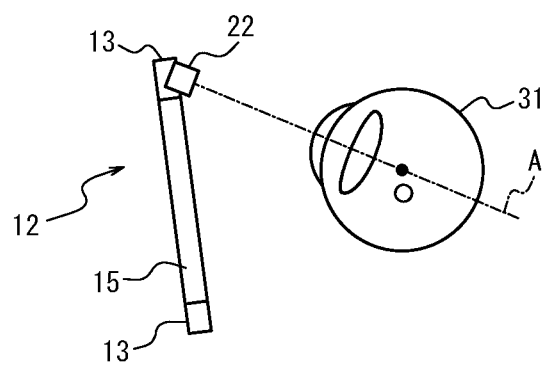
FIG. 5 illustrates the relationship in terms of position and orientation between the eyeglass-front and the eyeball when the display image is visible.

Next, observation of a display image using the eyeglass-type display apparatus 10 is described. FIG. 4 illustrates the relationship in terms of position and orientation between the eyeglass-front 12 and the eyeball 31 as viewed from the front. FIG. 5 illustrates the relationship in terms of position and orientation between the eyeglass-front 12 and the eyeball 31 when the display image is visible. As illustrated in FIG. 4, when wearing the eyeglass-type display apparatus 10, the user normally looks at the scenery or objects in front of his eyes through the lens 15. The user's visual axis A at this time is illustrated in FIG. 4. By contrast, when looking at an image of the eyeglass-type display apparatus 10, the user rotates the eyeball 31 upward and directs the visual axis A towards the eyepiece optical unit 22, as illustrated in FIG. 5. As a result, the user can see the image projected by the eyeglass-type display apparatus 10. The angle at which the user looks upward at this time is 15° to 30° and is preferably approximately 25°.

Figure 6:
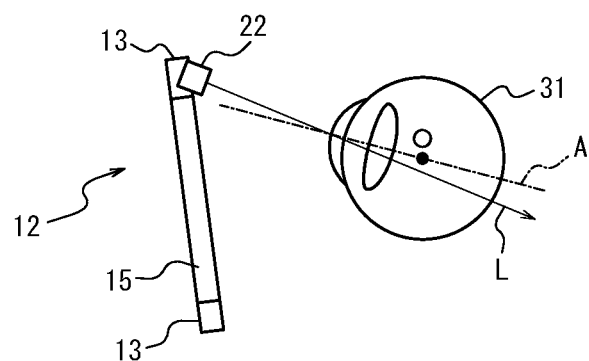
FIG. 6 illustrates an example of the state when the position adjustment between the eyeglass-type display apparatus and the eyeball is off.
Figure 7:
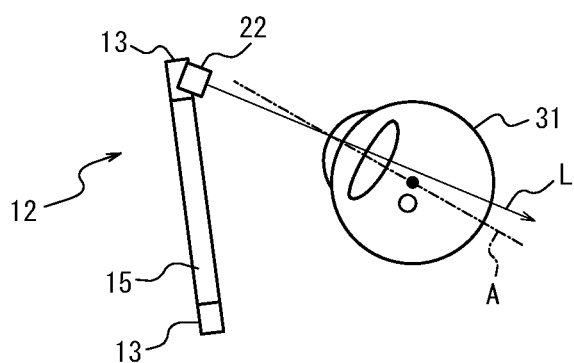
FIG. 7 illustrates an example of the state when the position adjustment between the eyeglass-type display apparatus and the eyeball is off.

The image light emitted from the display element in the image display unit 20 is guided along the rim 13 through the optical system in the image display unit 20 and is emitted from the compact eyepiece optical unit 22. Hence, the eye box allowing the user to observe the image well is limited to a relatively small range. It is therefore important for the eyeglass-type display apparatus 10 to allow position adjustment with respect to the user's eyeball 31. FIGS. 6 and 7 illustrate examples of the state when the position adjustment between the eyeglass-type display apparatus 10 and the eyeball 31 is off. In FIG. 6, an emitted light ray L that is emitted from the eyepiece optical unit 22 and passes through the pupil of the user's eyeball 31 passes below the eyeball center O. In this case, an image with a missing upper portion is projected into the user's field of view. In FIG. 7, an emitted light ray L that is emitted from the eyepiece optical unit 22 and passes through the pupil of the user's eyeball 31 passes above the eyeball center O. In this case, an image with a missing lower portion is projected into the user's field of view.

Figure 8:
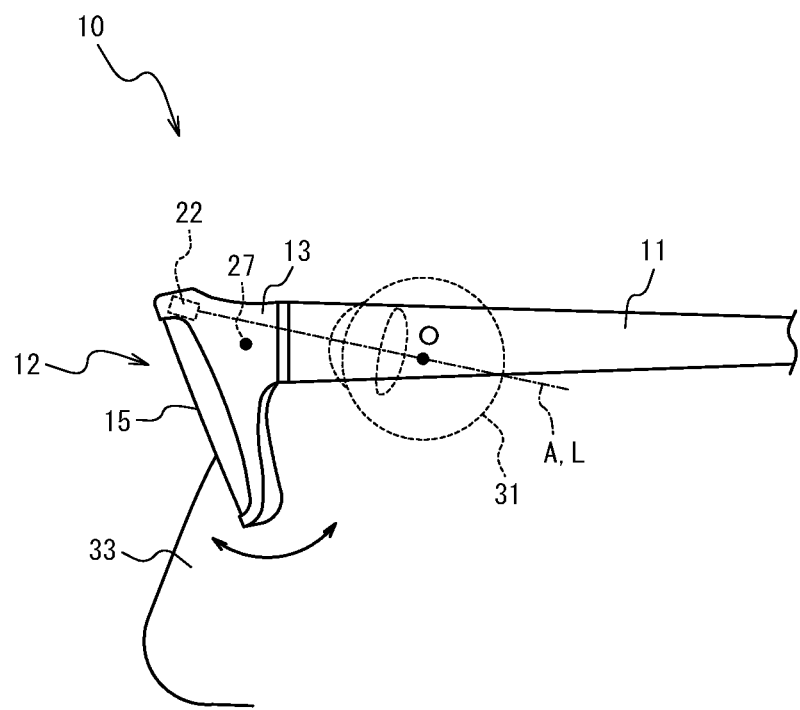
FIG. 8 illustrates position adjustment by rotating the eyeglass-front.

To address this issue, position adjustment is performed by changing the inclination of the eyeglass-type display apparatus 10 as a result of rotating the eyeglass-front 12 relative to the temple 11. FIG. 8 illustrates position adjustment by rotating the eyeglass-front 12. By rotating the eyeglass-front 12 so that the direction of the emitted light ray L emitted from the eyepiece optical unit 22 matches the direction passing through the eyeball center O of the eyeball 31, the user can rotate the eyeball 31 to direct the visual axis A towards the eyepiece optical unit 22 and view a display image from the eyepiece optical unit 22.

As described above, according to this embodiment, an angle adjuster that adjusts the inclination of the eyeglass-front 12 by rotating the eyeglass-front 12 relative to the left and right temples 11 is provided. In the angle adjuster, the rotating shaft 27 that adjusts inclination is positioned on the eyeglass-front 12 side of the user's eyeball center O as viewed from the side. Therefore, position adjustment can be performed accurately for good visibility of the display image at the position of the user's eye. Also, the eyepiece optical unit 22 is disposed on the side of the rim 13 facing the user and is therefore hidden at the back side of the rim 13 when viewed from the front. The eyeglass-type display apparatus 10 is thus indistinguishable in appearance from regular glasses and does not appear abnormal to others. Furthermore, the axis of rotation of the angle adjuster is positioned near the eyepiece optical unit 22 as viewed from the side, thereby allowing the inclination of the eyeglass-front 12 to be adjusted greatly by only slightly moving the eyeglass-front 12.

Embodiment 2

In Embodiment 1, the position of the eyepiece optical unit 22 is adjusted only by rotating the eyeglass-front 12 relative to the temple 11. Referring again to FIGS. 6 and 7, the visibility of the display image can also be improved by forward/backward or vertical movement of the eyepiece optical unit 22, without changing the inclination thereof. For example, by moving the eyepiece optical unit 22 in FIG. 6 horizontally toward the eyeball 31 without changing the inclination thereof, the emitted light ray L can be caused to pass through the eyeball center O. Alternatively, by shifting the eyepiece optical unit 22 upward without changing the inclination thereof, the emitted light ray L can be caused to pass through the eyeball center O. In Embodiment 2, the display image is adjusted by a combination of rotation about the rotating shaft 27 with position adjustment in the vertical direction and/or horizontal movement of the eyepiece optical unit 22.

Figure 9:
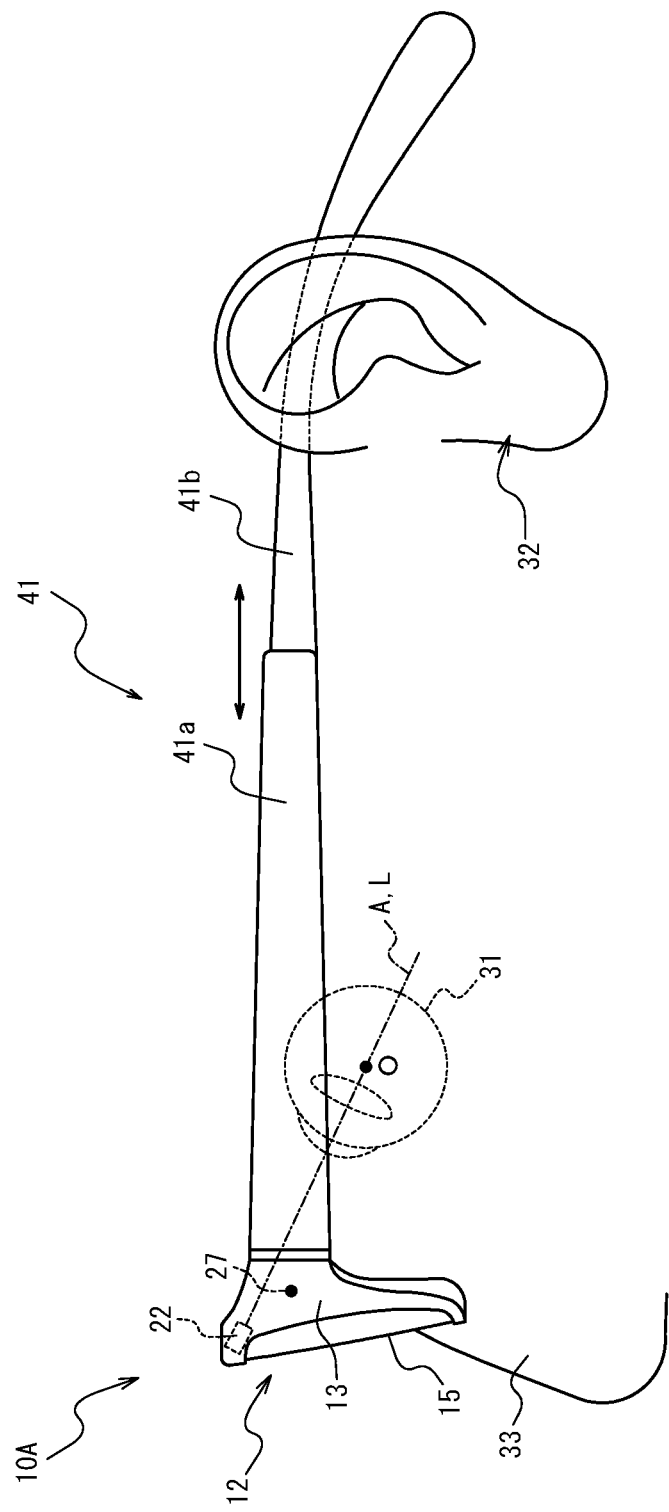
FIG. 9 illustrates the state of a user wearing an eyeglass-type display apparatus according to Embodiment 2.

FIG. 9 illustrates the state of a user wearing an eyeglass-type display apparatus 10A according to Embodiment 2. The eyeglass-type display apparatus 10A differs from the eyeglass-type display apparatus 10 according to Embodiment 1 in the temples 41. The temples 41 are each configured by a first portion 41a on the eyeglass-front 12 side and a second portion 41b that includes an ear hook positioned at the back of the temple 41. In the back portion of the first portion 41a, a cavity is provided in the longitudinal direction of the temple 41. In other words, the back portion of the first portion 41a is a sheath. The front portion of the second portion 41b, by contrast, is shaped to be slightly smaller than the cavity of the first portion 41a and is configured to be slidable inside the first portion 41a. However, the second portion 41b is configured not to separate from the first portion 41a. As a result, the temple 41 as a whole is configured to be expandable and contractible. A mechanism may be provided to fix the first portion 41a and the second portion 41b to each other so that their positional relationship does not change after expansion or contraction of the temple 41. Since the remaining structure is similar to that of Embodiment 1, identical constituent elements are labeled with the same reference signs, and a description thereof is omitted.

With the above structure, the eyeglass-type display apparatus 10A according to Embodiment 2 allows the temple 41 to be expanded or contracted as necessary for adjustment of the distance between the eyeglass-front 12 and the eyeball 31. For example, when the emitted light ray from the eyepiece optical unit 22 passes above the eyeball center O and the lower portion of the image viewed by the user is missing, adjustment is performed by expanding the temple 41 to be farther from the eyeglass-front 12, so that the emitted light ray passes through the eyeball center O. Position adjustment can thus be performed for the display image to be highly visible. Furthermore, after expanding or contracting the temples 41 to adjust the eyeglass-type display apparatus 10A to a position at which the fit is good and a good image is obtained, the final visibility state of the display image can be finely adjusted by adjusting the inclination of the eyeglass-front 12.

Embodiment 3

Figure 10:
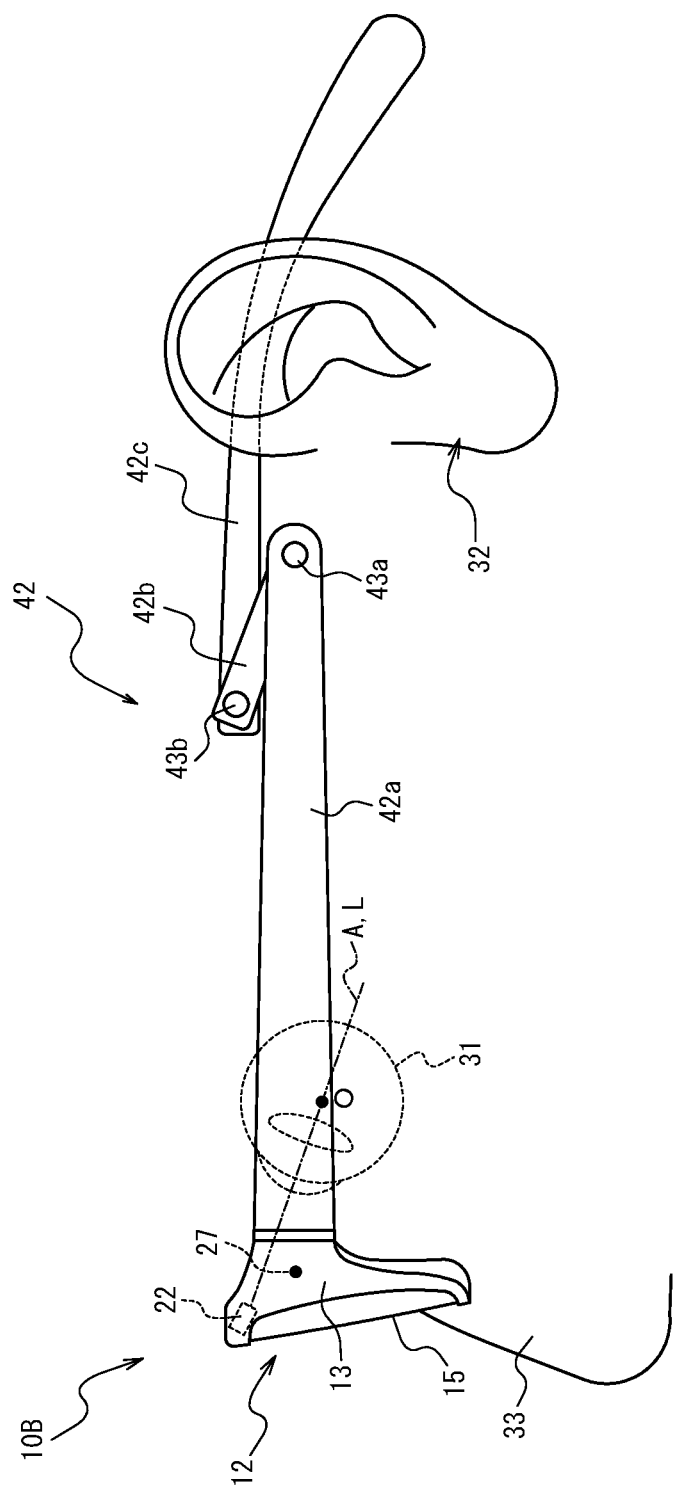
FIG. 10 illustrates the state of a user wearing an eyeglass-type display apparatus according to Embodiment 3.

FIG. 10 illustrates the state of a user wearing an eyeglass-type display apparatus 10B according to Embodiment 3. The eyeglass-type display apparatus 10B differs from the eyeglass-type display apparatus 10 according to Embodiment 1 in the temples 42. Each temple 42 is configured by a first portion 42a, a second portion 42b, and a third portion 42c in this order from the eyeglass-front 12 side. A first rotating shaft 43a is provided between the first portion 42a and the second portion 42b, which are connected to each other rotatably over a predetermined range about the first rotating shaft 43a. A second rotating shaft 43b is also provided between the second portion 42b and the third portion 42c, which are connected to each other rotatably over a predetermined range about the second rotating shaft 43b. Since the remaining structure is similar to that of Embodiment 1, identical constituent elements are labeled with the same reference signs, and a description thereof is omitted.

With the above-described structure, the eyeglass-type display apparatus 10B allows adjustment of the height of the ear hook by adjusting the height of the third portion 42c of the temple 42 even when the height positions of the user's ears 32 differ. As a result, while providing all users with a similar fit, the inclination of the eyeglass-front 12 can be adjusted in a similar way as in Embodiment 1. In this embodiment, by adjusting the mutual inclinations of the first portion 42a, second portion 42b, and third portion 42c of the temple 42, the back end of the first portion 42a, for example, can be lowered or raised. In this way as well, the inclination of the eyeglass-front 12 can be adjusted.

Embodiment 4

Figure 11:
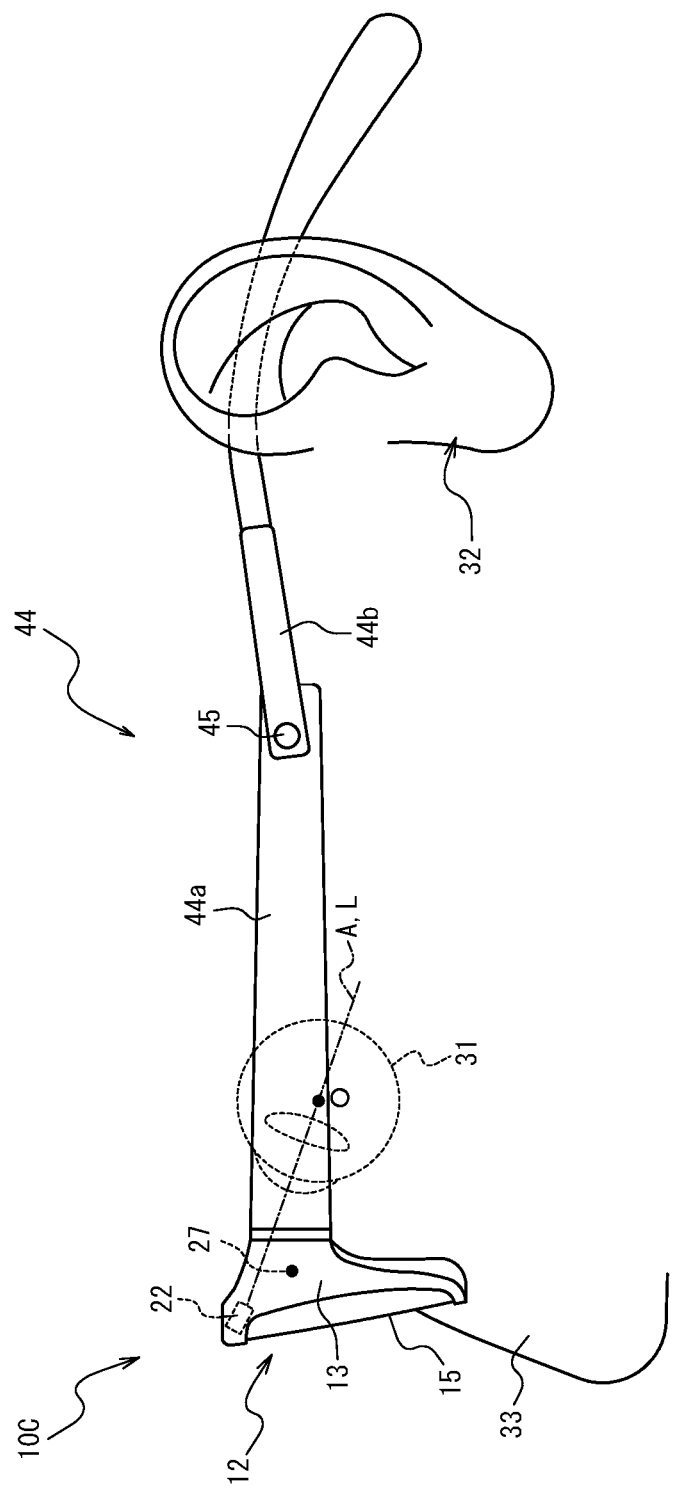
FIG. 11 illustrates the state of a user wearing an eyeglass-type display apparatus according to Embodiment 4.

FIG. 11 illustrates the state of a user wearing an eyeglass-type display apparatus 10C according to Embodiment 4. The temple 44 of this eyeglass-type display apparatus 10C includes a first portion 44a and a second portion 44b. The first portion 44a and the second portion 44b are connected rotatably over a predetermined range by a rotating shaft 45. Since the remaining structure is similar to that of Embodiment 1, identical constituent elements are labeled with the same reference signs, and a description thereof is omitted. The eyeglass-type display apparatus 10C according to Embodiment 4 has a simpler structure than the eyeglass-type display apparatus 10B according to Embodiment 3 while still allowing adjustment with respect to the height position of the user's ears 32.

Embodiment 5

Figure 12:
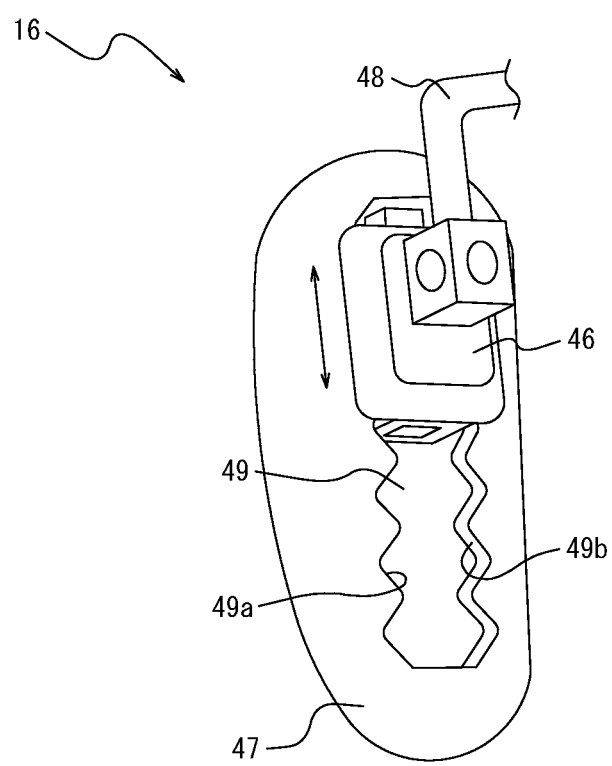
FIG. 12 illustrates a mechanism to adjust the height position of the nose pads of an eyeglass-type display apparatus according to Embodiment 5.

In addition to the structure of the eyeglass-type display apparatus 10A according to Embodiment 2, the eyeglass-type display apparatus according to Embodiment 5 includes a mechanism to adjust the height position of the nose pads 16. FIG. 12 illustrates the mechanism to adjust the height position of the nose pads 16 of an eyeglass-type display apparatus according to Embodiment 5. FIG. 12 is a perspective view of the nose pad 16 as seen from the opposite side from the portion that abuts the nose. The nose pad 16 is configured by a slide part 46 and a nose pad 47. The slide part 46 is connected by a pad arm 48 to the portion of the rim 13 on the side facing the nose. A slide groove 49 is provided in the nose pad 47. The slide groove 49 is structured so that a plurality of protrusions and recesses in a wave shape are formed along both sides 49a, 49b extending in the longitudinal direction of the slide groove 49 and so that the interval between the sides changes cyclically in the longitudinal direction. In the slide part 46, a plate spring (elastic member) biased towards and abutting the recesses on the sides 49a, 49b of the slide groove 49 is fixed within the slide groove 49. The slide part 46 is configured to slide along the slide groove 49 so that the plate spring does not separate from the slide groove 49. By the user placing a hand on the nose pad 47 and applying pressure vertically, the plate spring resists the elastic force, leaving the recesses of the sides 49a, 49b and moving to the adjacent recesses. In this way, the user can move the nose pad 16 vertically to adjust the height position. FIG. 12 illustrates the height position adjustment mechanism of the left nose pad 16, but the right nose pad 16 also has a similar height position adjustment mechanism.

In the eyeglass-type display apparatus of Embodiment 2, the position of abutment between the user's nose 33 and the nose pad 16 of the eyeglass-front 12 ends up shifting upon expansion or contraction of the temple 41. For example, when the temple 41 is expanded, the eyeglass-front 12 projects forward, causing the nose pad 16 to lower in order to abut the nose 33. To address this issue, the position of the nose pad 16 relative to the eyeglass-front 12 is adjusted vertically in this embodiment using the height position adjustment mechanism. By providing the height position adjustment mechanism, the user's eyeglass-type display apparatus can be adjusted to a good fit while adjusting the inclination and position of the eyeglass-front 12 so as to obtain a good image.

As a method of adjustment when using the eyeglass-type display apparatus according to this embodiment, the length of the temple 41 may first be determined, and the height position of the nose pad 16 may be adjusted in accordance with the length of the temple 41. As a result, a good image can be observed. At this time, the contact between the nose pad 16 and the nose and the distance between the lens 15 and the eyeball 31 affect the fit of the eyeglass-type display apparatus. Therefore, during these adjustments, the position is adjusted while emphasizing a good fit over the display condition of the image. Once the length of the temples 41 and the height of the nose pads 16 are determined, the eyeglass-front 12 is then adjusted by rotation around the rotating shaft 27 and fixed at the position allowing viewing of the best image. As a result, the eyeglass-type display apparatus can be adjusted to the best state. The height position adjustment mechanism of this embodiment slides the slide part 46 relative to the groove provided in the nose pad 47, thus offering the advantage of being compact and of not being conspicuous as a result of being hidden by the rim 13 when viewed from the front.

This disclosure is not limited to the above embodiments, and a variety of changes and modifications may be made. For example, the lenses may be corrective or non-corrective, or may be omitted when not needed by the user. In this case, the eyeglass-front is mainly constituted by the frame. Also, the rim may be omitted if the intermediate member is directly connected to the lens. In this case, the image display unit is provided directly along the lens. The image display unit may be provided for the eye on either the right or left side, or a total of two image display units may be provided, one corresponding to each eye. The image display unit is not limited to overlapping the rim above the lens and may be provided in overlap with the lower rim as viewed from the front. Alternatively, the image display unit may be provided at any position near the rim or the lens. Furthermore, a variety of methods other than those exemplified above are possible for the mechanism that rotates the eyeglass-front with respect to the temples.

Next, reference examples of this disclosure are described. The eyeglass-type display apparatus of these reference examples adjusts the eyepoint in accordance with individual user differences using a bridge adjuster that adjusts the relative positions of the left and right eyeglass lens portions.

First Reference Example

Figure 13:
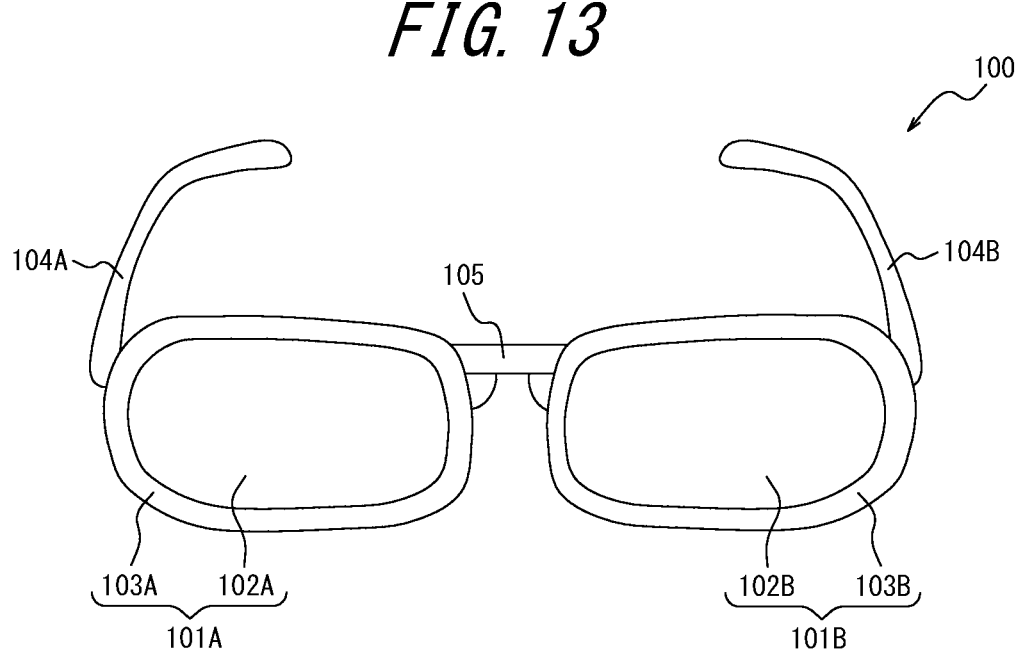
FIG. 13 is a front perspective view illustrating the configuration of an eyeglass-type display apparatus of a first reference example.
Figure 14:
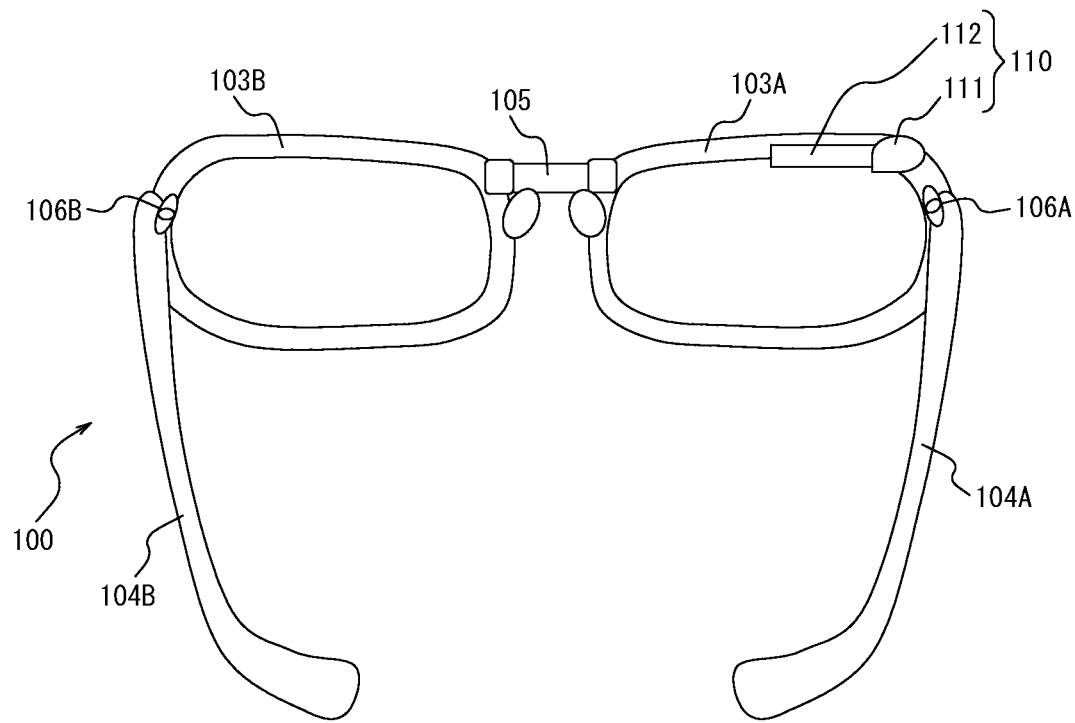
FIG. 14 is a back perspective view illustrating the configuration of the eyeglass-type display apparatus of the first reference example.

FIG. 13 is a front perspective view illustrating the configuration of an eyeglass-type display apparatus 100 according to a first reference example. FIG. 14 is a back perspective view illustrating the configuration of an eyeglass-type display apparatus 100 according to the first reference example. The eyeglass-type display apparatus 100 according to this reference example includes eyeglass lens portions 101A and 101B disposed in front of the user's left and right eyes, temples 104A and 104B connected to the eyeglass lens portions and worn on the user's head, a bridge 105 between the eyeglass lens portions 101A and 101B, hinges 106A and 106B that connect the temples 104A and 104B foldably to the eyeglass lens portions 101A and 101B, and a display apparatus (image display unit) 110 that displays an image to the user.

The eyeglass lens portion 101A is disposed in front of the user's right eye and is constituted by an eyeglass lens 102A and a rim 103A that holds the eyeglass lens 102A. Similarly, the eyeglass lens portion 101B is disposed in front of the user's left eye and is constituted by an eyeglass lens 102B and a rim 103B that holds the eyeglass lens 102B.

Each of the eyeglass lens portions 101A and 101B is not limited to including both the eyeglass lens and the rim and may be configured to include only one of the eyeglass lens or the rim. For example, the eyeglass-type display apparatus may be a rimless type that does not include rims holding the eyeglass lenses. The eyeglass-type display apparatus may also lack eyeglass lenses, with the eyeglass lens portions including only rims.

The display apparatus (image display unit) 110 includes a body 111 and an eyepiece optical unit 112. The body 111 has a display element and is disposed on the side of the rim 103A facing the user. The eyepiece optical unit 112 projects image light from the display element to the user's eyeball E1 and is disposed to lie along the rim 103A on the side of the rim 103A facing the user. This eyeglass-type display apparatus 100 is a wearable device with an unimpaired appearance, since the display apparatus 110 is disposed on the side of the rim 103A facing the user. A battery or the like supplying power to the display element may be embedded in the rim 103A or the temple 104A, or a configuration may be adopted to supply power from an external device over a wired connection.

Figure 15:
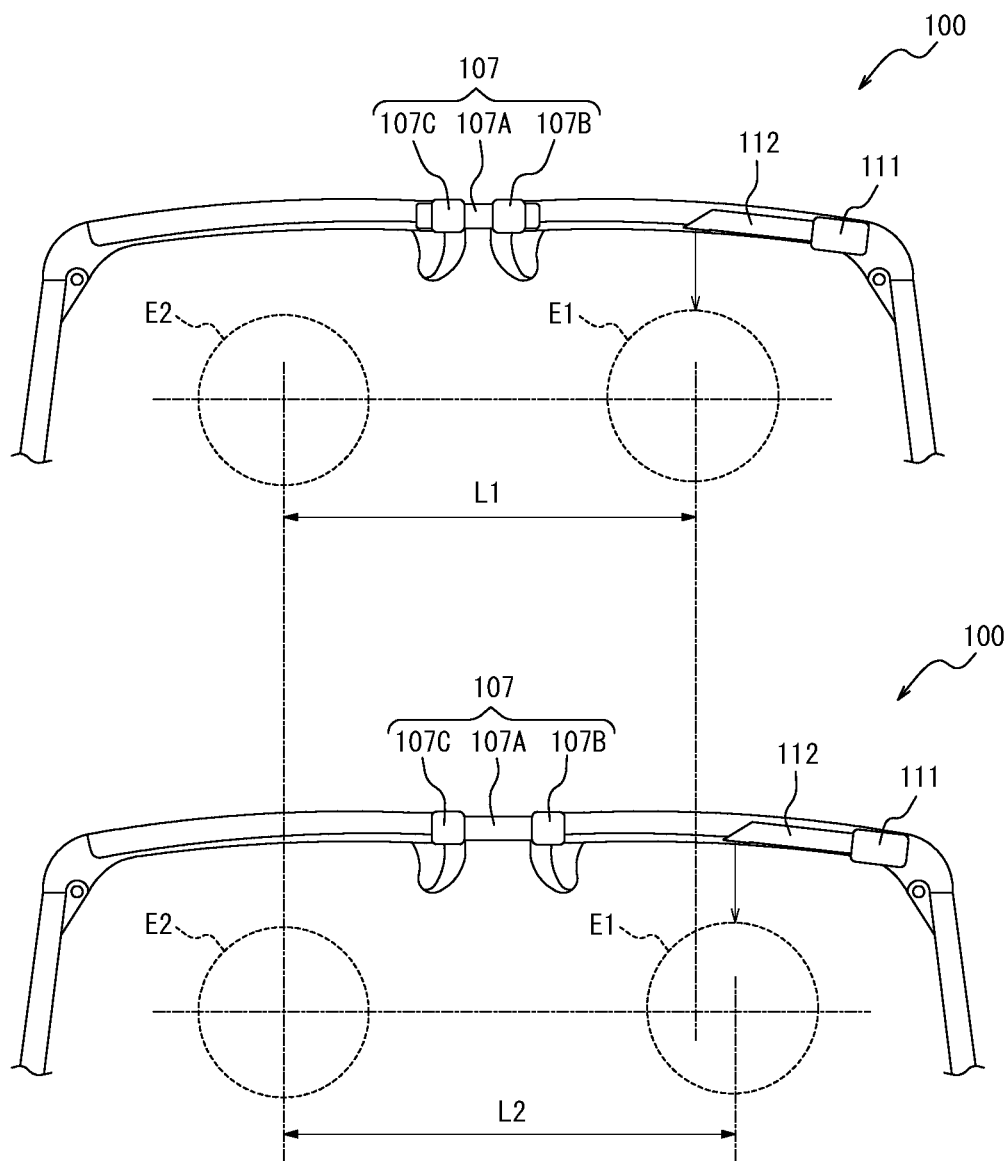
FIG. 15 is a top view illustrating the bridge adjuster in the eyeglass-type display apparatus of the first reference example.

FIG. 15 is a top view illustrating a bridge adjuster 107 in the eyeglass-type display apparatus 100 of the first reference example. FIG. 15 illustrates the case of a user with pupillary distance L1 wearing the eyeglass-type display apparatus 100 and the case of a user with pupillary distance L2, which is greater than pupillary distance L1, wearing the eyeglass-type display apparatus 100. The bridge 105 includes a bridge adjuster 107 constituted by a slide shaft 107A and slide shaft fixing portions 107B and 107C that fix the slide shaft 107A. The slide shaft fixing portions 107B and 107C are respectively fixed to the rims 103A and 103B. Furthermore, the slide shaft fixing portions 107B and 107C include respective holes. The ends of the slide shaft 107A are inserted in the holes of the slide shaft fixing portions 107B and 107C to fix the slide shaft 107A.

The bridge adjuster 107 allows adjustment of the eyepoint for the users with pupillary distance L1 and pupillary distance L2 by moving the slide shaft fixing portions 107B and 107C along the slide shaft 107A. When wearing the eyeglass-type display apparatus 100, the user with pupillary distance L2 moves the slide shaft fixing portions 107B and 107C along the slide shaft 107A so that the distance between the slide shaft fixing portions 107B and 107C becomes longer than when the user with pupillary distance L1 wears the eyeglass-type display apparatus 100. Since the slide shaft fixing portions 107B and 107C are fixed to the rims 103A and 103B, sliding the slide shaft fixing portions 107B and 107C to increase the distance therebetween also increases the distance between the rims 103A and 103B. In other words, the relative positions of the left and right rims 103A and 103B are adjusted. As a result of the eyepiece optical unit 112 that projects image light onto the user's eyeball being disposed on the side of the rim 103A facing the user, the eyepiece optical unit 112 moves along with the rim 103A upon an increase in the distance between the rims 103A and 103B. In this way, the eyeglass-type display apparatus 100 of this reference example allows adjustment of the eyepoint with the bridge adjuster 107 from a position corresponding to the pupillary distance L1 to a position corresponding to the pupillary distance L2. Furthermore, the eyeglass-type display apparatus 100 of this reference example allows adjustment of the eyepoint with a simple structure and has an unimpaired appearance that does not differ from regular eyeglasses.

Second Reference Example

Figure 16:
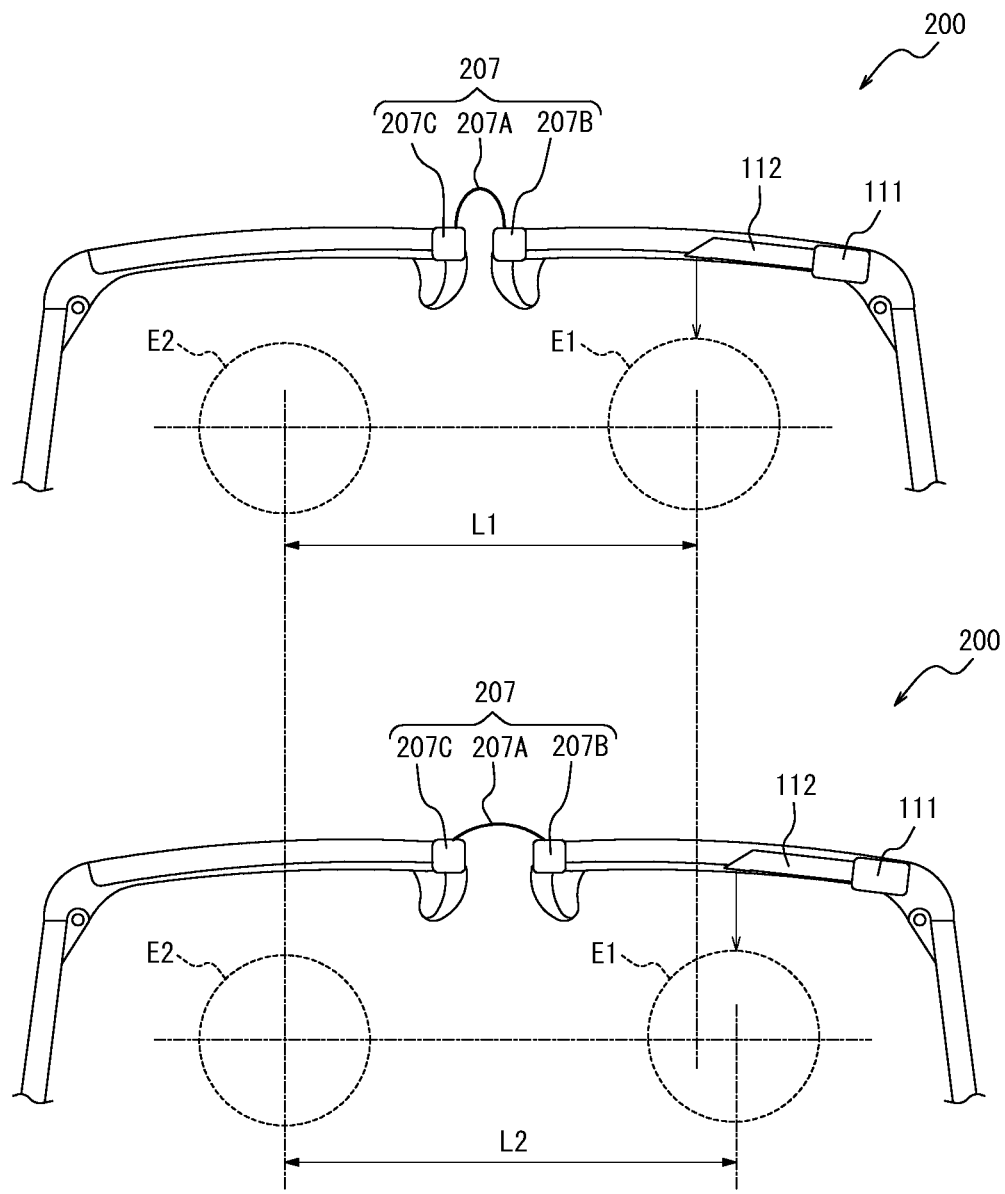
FIG. 16 is a top view illustrating the bridge adjuster in an eyeglass-type display apparatus of a second reference example.

Next, an eyeglass-type display apparatus 200 of the second reference example is described. FIG. 16 is a top view illustrating a bridge adjuster 207 in an eyeglass-type display apparatus 200 according to the second reference example. FIG. 16 illustrates the case of a user with pupillary distance L1 wearing the eyeglass-type display apparatus 200 and the case of a user with pupillary distance L2, which is greater than pupillary distance L1, wearing the eyeglass-type display apparatus 200. The difference from the eyeglass-type display apparatus 100 of the first reference example is in the structure of the bridge adjuster 207. The remaining configuration is similar to that of the first reference example. The bridge adjuster 207 according to this reference example is constituted by an intervening portion 207A that is an elastic member (plastic member), such as a wire or rubber, and fixing portions 207B and 207C to which the ends of the intervening portion 207A are fixed. The fixing portions 207B and 207C are respectively fixed to the rims 103A and 103B.

The bridge adjuster 207 allows adjustment of the eyepoint for the users with pupillary distance L1 and pupillary distance L2 by changing the shape of the intervening portion 207A. When wearing the eyeglass-type display apparatus 200, the user with pupillary distance L2 changes the shape of the intervening portion 207A so that the distance between the fixing portions 207B and 207C becomes longer than when the user with pupillary distance L1 wears the eyeglass-type display apparatus 200. Since the fixing portions 207B and 207C are fixed to the rims 103A and 103B, changing the shape of the intervening portion 207A to increase the distance between the fixing portions 207B and 207C also increases the distance between the rims 103A and 103B. In other words, the relative positions of the left and right eyeglass lens portions 101A and 102B are adjusted. As a result of the eyepiece optical unit 112 that projects image light onto the user's eyeball E1 being disposed on the side of the rim 103A facing the user, the eyepiece optical unit 112 moves along with the rim 103A upon an increase in the distance between the rims 103A and 103B. In this way, the eyeglass-type display apparatus 200 of this reference example allows adjustment of the eyepoint with the bridge adjuster 207 from a position corresponding to the pupillary distance L1 to a position corresponding to the pupillary distance L2.

Figure 17:
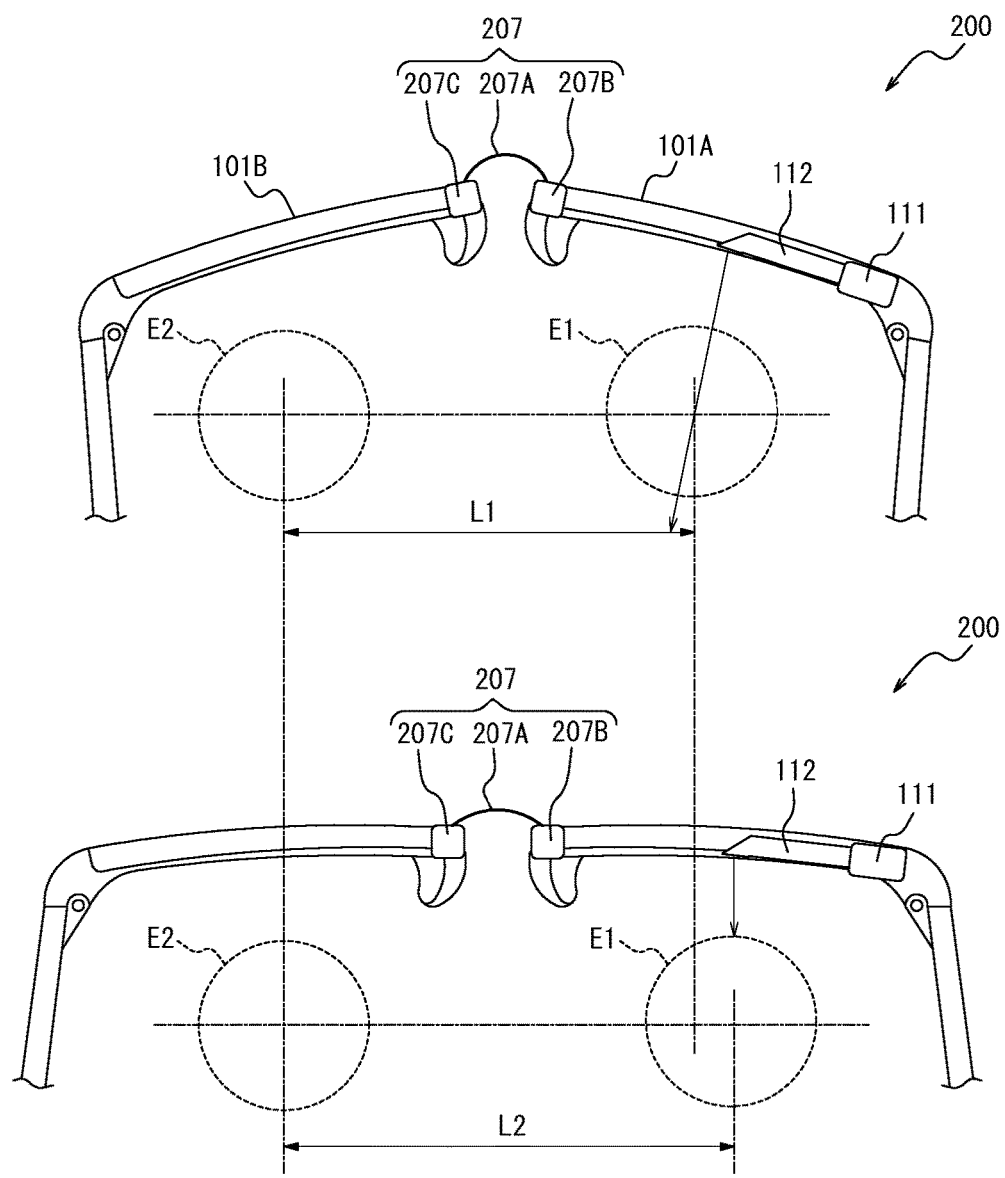
FIG. 17 is a top view illustrating the bridge adjuster in the eyeglass-type display apparatus of the second reference example.
Figure 18:
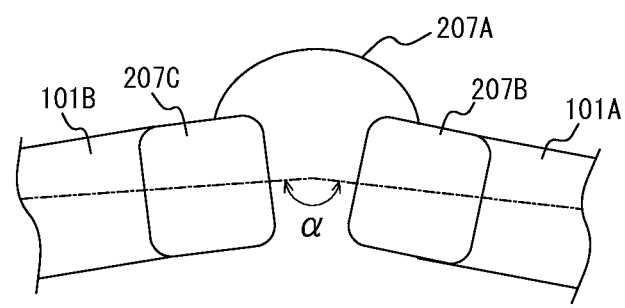
FIG. 18 is an expanded view of the bridge adjuster in the eyeglass-type display apparatus of the second reference example.
Figure 18:
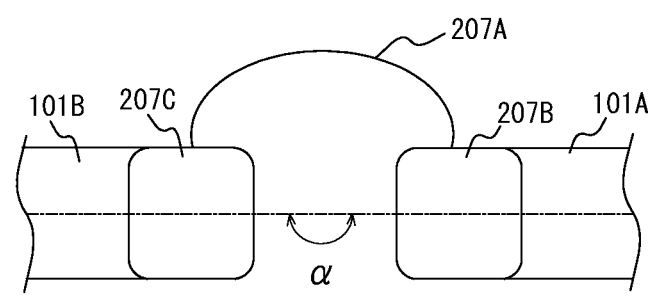

FIG. 17 is a top view illustrating a bridge adjuster 207 in the eyeglass-type display apparatus 200 according to the second reference example. FIG. 17 illustrates the case of a user with pupillary distance L1 wearing the eyeglass-type display apparatus 200 and the case of a user with pupillary distance L2, which is greater than pupillary distance L1, wearing the eyeglass-type display apparatus 200. FIG. 18 is an expanded view of the bridge adjuster 207 in the eyeglass-type display apparatus 200 of the second reference example. The configuration is the same as that of the eyeglass-type display apparatus 200 illustrated in FIG. 16.

Along with the position of the eyepiece optical unit 112, the bridge adjuster 207 of this reference example can also change the emission angle of image light emitted from an eyepiece optical unit 112 to the user's eyeball E1 by changing the shape of the intervening portion 207A. As a result, adjustment of the eyepoint can be made for each of the user with pupillary distance L1 and the user with pupillary distance L2. When wearing the eyeglass-type display apparatus 200, the user with pupillary distance L1 changes the shape of the intervening portion 207A so that the angle α between the eyeglass lens portion 101A and the eyeglass lens portion 101B is smaller than when the user with pupillary distance L2 wears the eyeglass-type display apparatus 200. As a result of the eyepiece optical unit 112 that projects image light onto the user's eyeball E1 being disposed on the side of the rim 103A facing the user, a decrease in the angle α causes the arrangement position of the eyepiece optical system (the orientation of the eyepiece window) relative to the user's eyeball E1 to change along with the angle α. Consequently, the eyepiece window of the eyepiece optical unit 112 is positioned slightly on the outside from the eyeball front direction, but image light can be emitted toward the user's eyeball E1. In this way, the eyeglass-type display apparatus 200 of this reference example allows adjustment with the bridge adjuster 207 of the angle α between the eyeglass lens portion 101A and the eyeglass lens portion 101B, thereby allowing adjustment of the eyepoint from a position corresponding to the pupillary distance L1 to a position corresponding to the pupillary distance L2.

Figure 19:
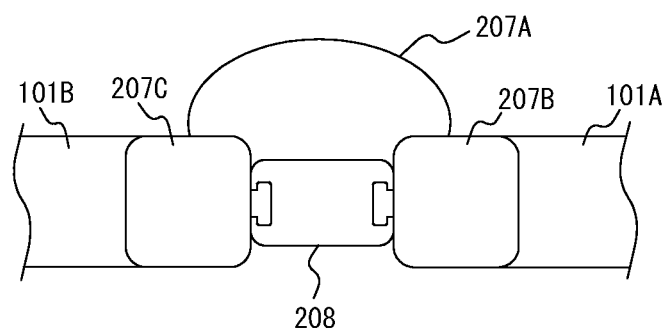
FIG. 19 is an expanded view of a modification to the bridge adjuster in the eyeglass-type display apparatus of the second reference example.

Next, a modification to the second reference example is described. FIG. 19 is an expanded view of a modification to the bridge adjuster 207 in the eyeglass-type display apparatus 200 of the second reference example. This modification differs from the eyeglass-type display apparatus 200 of the second reference example by including a separating member 208 fixed between the fixing portions 207B and 207C.

The fixing portion 207B of the bridge adjuster 207 includes a projection on the side by the fixing portion 207C. Similarly, the fixing portion 207C of the bridge adjuster 207 includes a projection on the side by the fixing portion 207B. The separating member 208 includes recesses, disposed between the fixing portions 207B and 207C, that engage with the projections on the fixing portions 207B and 207C. By inserting the separating member 208 between the fixing portions 207B and 207C, the distance between the left and right rims 103A and 103B can be maintained constant, even if an external force is applied to the intervening portion 207A. In other words, the eyepoint adjusted for the user can be maintained constant.

Third Reference Example

Figure 20:
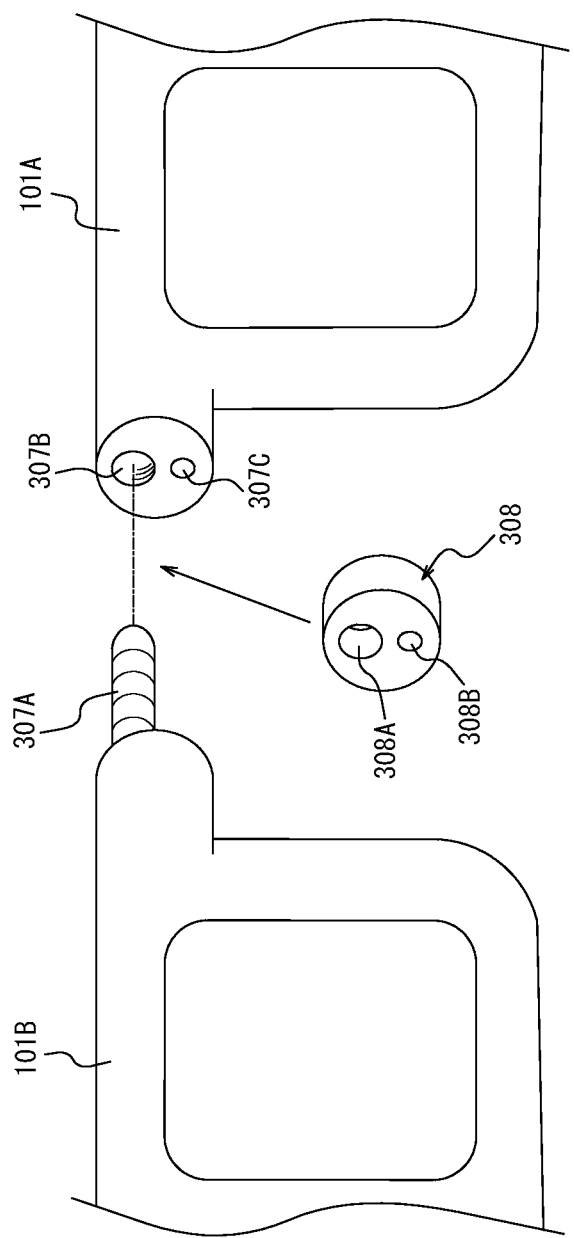
FIG. 20 is an expanded view illustrating the bridge adjuster in an eyeglass-type display apparatus of a third reference example.

Next, an eyeglass-type display apparatus 300 of the third reference example is described. FIG. 20 is an expanded view illustrating a bridge adjuster 307 in an eyeglass-type display apparatus 300 according to the third reference example. The difference from the eyeglass-type display apparatus 100 of the first reference example is in the structure of the bridge adjuster 307. The remaining configuration is similar to that of the first reference example. The bridge adjuster 307 according to this reference example is configured by a screw 307A provided on the rim 103B, a screw receiving portion 307B and a positioning projection 307C provided on the rim 103A, and a separating member 308.

The bridge adjuster 307 allows adjustment of the eyepoint for users with different pupillary distances by selecting whether to include the separating member 308 and the size thereof when included. When the user's pupillary distance is narrow, the eyeglass-type display apparatus 300 is provided with a short distance between the rims 103A and 103B by directly fixing the screw 307A to the screw receiving portion 307B. At this time, the eyepiece optical unit 112 moves along with the rim 103A, thus allowing adjustment to an eyepoint that matches a user with narrow pupillary distance. On the other hand, when the user's pupillary distance is large, the positioning projection 307C is matched to an opening for positioning 308B in the separating member 308, and the separating member 308 is temporarily fixed to the rim 103A. By fixing the screw 307A and the screw receiving portion 307B via the temporarily fixed separating member 308, the eyeglass-type display apparatus 300 has a long distance between the rims 103A and 103B. At this time, the eyepiece optical unit 112 moves along with the rim 103A, thus allowing adjustment to an eyepoint that matches a user with wide pupillary distance. The bridge adjuster 307 thus allows adjustment of the distance between the rims 103A and 103B by selecting whether to include the separating member 308 and the size thereof when included. In other words, the relative positions of the rims 103A and 103B can be adjusted. A plurality of separating members 308 of different sizes, e.g. small, medium, and large, may be prepared. By preparing a plurality of sizes of separating members 308, the eyeglass-type display apparatus 300 can adjust the eyepoint stepwise. A separating member 308 with a custom size for the user may also be prepared. In this way, by simply inserting the separating member 308 in any eyeglass-type display apparatus with a similar mechanism, the user can adjust the eyepoint in accordance with the user's own pupillary distance and head size. The configuration of the bridge adjuster 307 and the separating member 308 is not limited to the configuration of this reference example, and well-known techniques using magnets, an engaging mechanism with recesses and projections, and the like may be used.

Fourth Reference Example

Figure 21:
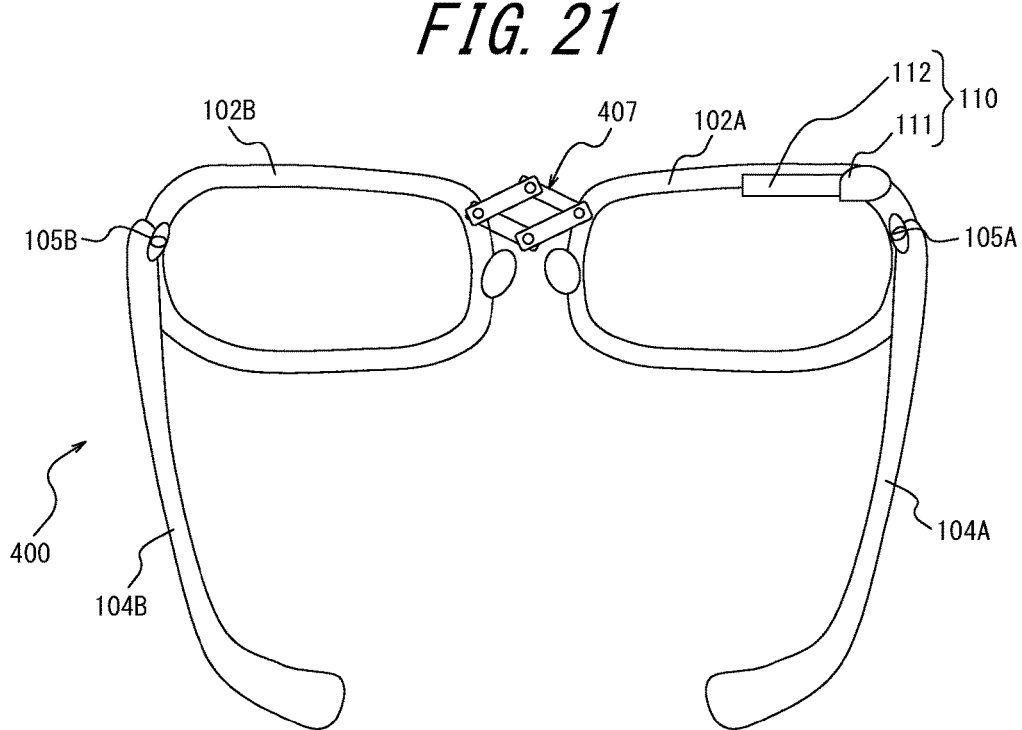
FIG. 21 is a back perspective view illustrating the configuration of an eyeglass-type display apparatus of a fourth reference example.
Figure 22:
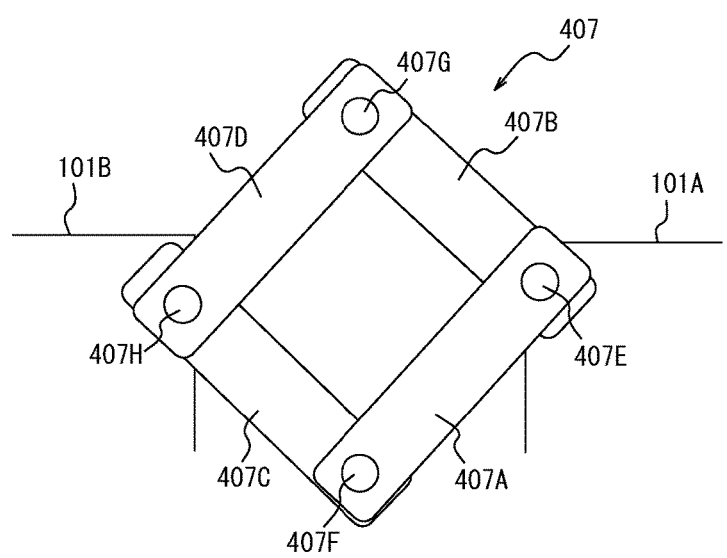
FIG. 22 is an expanded view illustrating the bridge adjuster in the eyeglass-type display apparatus of the fourth reference example.

Next, an eyeglass-type display apparatus 400 of the fourth reference example is described. FIG. 21 is a back perspective view illustrating the configuration of an eyeglass-type display apparatus of a fourth reference example. FIG. 22 is an expanded view (top view) of a bridge adjuster 407 in the eyeglass-type display apparatus 400 of the fourth reference example. The difference from the eyeglass-type display apparatus 100 of the first reference example is in the structure of the bridge adjuster 407. The remaining configuration is similar to that of the first reference example. The bridge adjuster 407 according to this reference example is configured by four supports 407A, 407B, 407C, and 407D, and by four fixing portions 407E, 407F, 407G, and 407H that act as the axes of rotation of the supports. One end of the support 407A, along with one end of the support 407B, is rotatably fixed to the eyeglass lens portion 101A by the fixing portion 407E, and the other end of the support 407A is rotatably fixed to one end of the support 407C by the fixing portion 407F. The other end of the support 407C, along with one end of the support 407D, is rotatably fixed to the eyeglass lens portion 101B by the fixing portion 407H. The other end of the support 407D is rotatably fixed to the other end of the support 407B by the fixing portion 407G.

In the bridge adjuster 407, the fixing portion 407E fixes the supports 407A and 407B to the eyeglass lens portion 101A, and the fixing portion 407H fixes the supports 407C and 407D to the eyeglass lens portion 101B. Therefore, by moving the four supports 407A, 407B, 407C, and 407D with the four fixing portions 407E, 407F, 407G, and 407H as axes of rotation, the relative positions of the eyeglass lens portion 101A and the eyeglass lens portion 101B can be adjusted. In other words, the distance between the eyeglass lens portion 101A and the eyeglass lens portion 101B can be adjusted. As a result, the eyepoint can be adjusted to correspond to individual differences between users.

Fifth Reference Example

Figure 23:
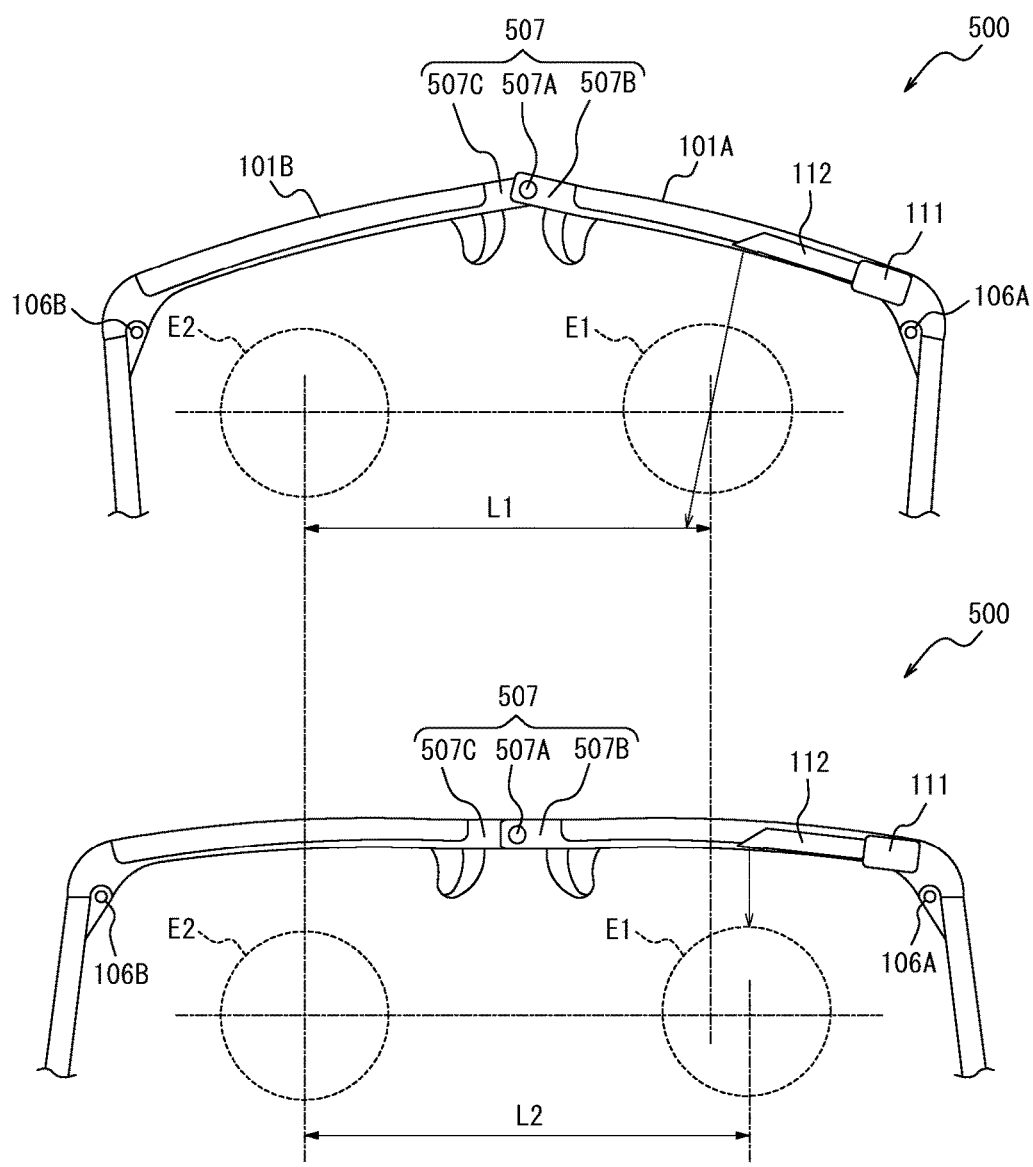
FIG. 23 is a top view illustrating the bridge adjuster in an eyeglass-type display apparatus of a fifth reference example.
Figure 24:
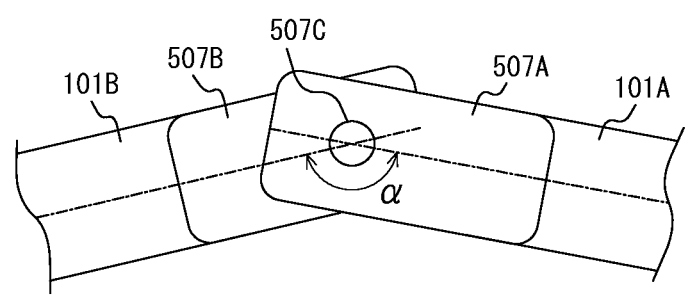
FIG. 24 is an expanded view of the bridge adjuster in the eyeglass-type display apparatus of the fifth reference example.
Figure 24:
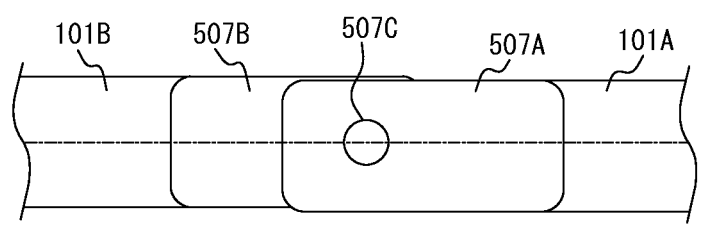

Next, an eyeglass-type display apparatus 500 of the fifth reference example is described. FIG. 23 is a top view illustrating a bridge adjuster 507 in the eyeglass-type display apparatus 500 according to the fifth reference example. FIG. 24 is an expanded view of the bridge adjuster 507 in the eyeglass-type display apparatus 500 of the fifth reference example. The difference from the eyeglass-type display apparatus 100 of the first reference example is in the structure of the bridge adjuster 507. The remaining configuration is similar to that of the first reference example. The bridge adjuster 507 according to this reference example is configured by a rim extension 507A extending from the rim 103A, a rim extension 507B extending from the rim 103B, and a fixing portion 507C that rotatably fixes one end of the rim extension 507A and one end of the rim extension 507B.

The bridge adjuster 507 allows adjustment of the angle α between the eyeglass lens portion 101A and the eyeglass lens portion 101B by rotating the eyeglass lens portion 101A and the eyeglass lens portion 101B with the fixing portion 507C as the axis of rotation. When wearing the eyeglass-type display apparatus 500, a user with pupillary distance L1 rotates the eyeglass lens portion 101A and the eyeglass lens portion 101B so that the angle α between the eyeglass lens portion 101A and the eyeglass lens portion 101B is smaller than when a user with pupillary distance L2 wears the eyeglass-type display apparatus 500. As a result of the eyepiece optical unit 112 that projects image light onto the user's eyeball E1 being disposed on the side of the rim 103A facing the user, a decrease in the angle α causes the arrangement position of the eyepiece optical system (the orientation of the eyepiece window) relative to the user's eyeball E1 to change along with the angle α. Consequently, the eyepiece window of the eyepiece optical unit 112 is positioned slightly on the outside from the eyeball front direction, but image light can be emitted toward the user's eyeball E1. In this way, the eyeglass-type display apparatus 500 of this reference example allows adjustment with the bridge adjuster 507 of the angle α between the eyeglass lens portion 101A and the eyeglass lens portion 101B, thereby allowing adjustment of the eyepoint from a position corresponding to the pupillary distance L1 to a position corresponding to the pupillary distance L2.

Figure 25A:
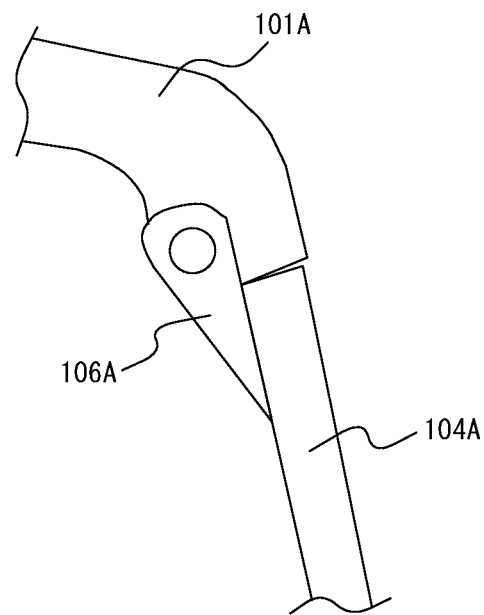
FIGS. 25A and 25B are expanded views illustrating the temple angle adjustment member in a modification to the eyeglass-type display apparatus of the fifth reference example.
Figure 25B:
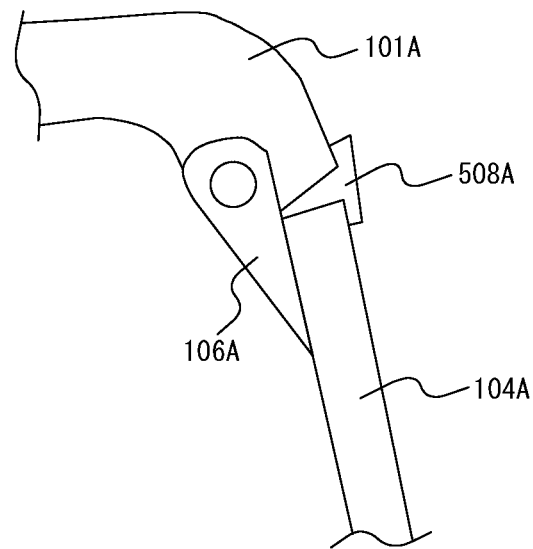

Next, a modification to the fifth reference example is described. FIGS. 25A and 25B are expanded views illustrating a modification to the eyeglass-type display apparatus 500 of the fifth reference example. This modification differs from the eyeglass-type display apparatus 500 of the fifth reference example by including a temple angle adjustment member 508A disposed between the eyeglass lens portion 101 and the temple 104. FIG. 25A is an expanded view of a hinge 106A when the eyeglass-type display apparatus 500 does not include the temple angle adjustment member 508A, and FIG. 25B is an expanded view of the hinge 106A when the eyeglass-type display apparatus 500 does include the temple angle adjustment member 508A. The eyeglass-type display apparatus 500 of the fifth reference example illustrated in FIG. 23 allows adjustment of the angle between the left and right eyeglass lens portions 101A and 101B with the bridge adjuster 507. At this time, by decreasing the angle between the left and right eyeglass lens portions 101A and 101B, the distance between the left and right temple portions 104A and 104B fixed to the user's head decreases. Conversely, by increasing the angle between the left and right eyeglass lens portions 101A and 101B, the distance between the left and right temple portions 104A and 104B fixed to the user's head increases.

The temple angle adjustment member 508A is attached so as to be sandwiched between the eyeglass lens portion 101 and the temple 104. By attaching a temple angle adjustment member 508A between each of the left and right eyeglass lens portions and temples, the distance between the temples 104A and 104B decreases. As a result, the user can make adjustments to increase the angle between the left and right eyeglass lens portions 101A and 101B with the bridge adjuster 107 without increasing the distance between the left and right temples 104A and 104B. That is, adjustments can be made with the bridge adjuster 107 with respect to the pupillary distance, and adjustments with respect to head size can also be made with the temple angle adjustment member 508A. In other words, the angle between the eyeglass lens portion 101A and the temple 104A can be adjusted with the temple angle adjustment member 508A. In this reference example, the temple angle adjustment member 508A is a separate member, but other configurations may be adopted. For example, a hole may be formed in the side of the temple 104A that abuts the eyeglass lens portion 101A, and a slidably fixed extending member (temple angle adjuster) may be provided in the hole. By switching between the state with the extending member housed in the hole and the state with the extending member disposed outside of the hole, the angle formed between the eyeglass lens portion 101A and the temple 104A can be adjusted. The temple angle adjustment member 508A may also be a member that restricts rotation of the hinge 106A.

Figure 26:
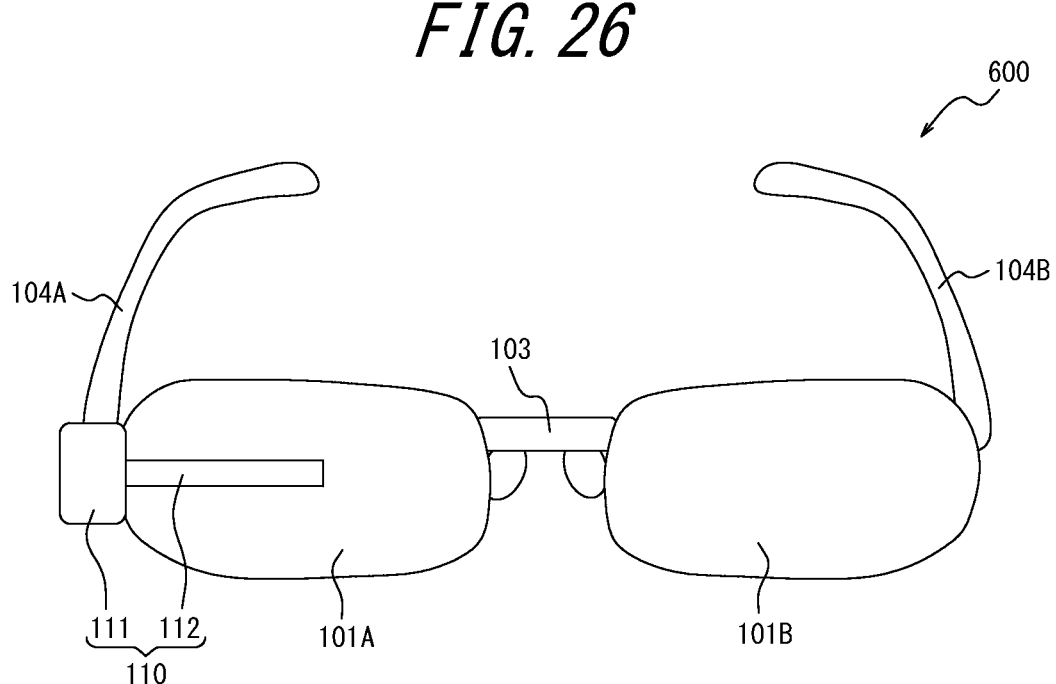
FIG. 26 is a front perspective view illustrating a modification to the arrangement position of the display apparatus.
Figure 27:
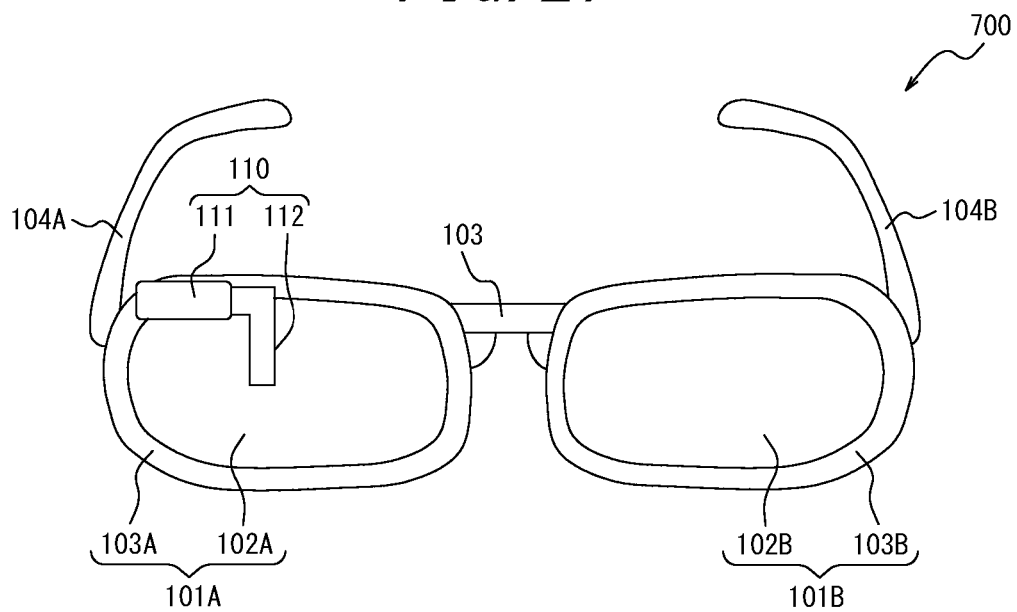
FIG. 27 is a front perspective view illustrating a modification to the arrangement position of the display apparatus.

A variety of modifications and changes may be made to the reference examples. For example, the eyeglass-type display apparatus may be a rimless type that does not have rims holding the eyeglass lenses. In this case, the bridge adjuster may of course adjust the relative positions between the eyeglass lenses. The eyeglass-type display apparatus may also lack eyeglass lenses, with the eyeglass lens portions including only rims. In this case, the bridge adjuster may of course adjust the relative positions between the rims. As illustrated in FIG. 26, the display apparatus (image display unit) may be provided in front of the eyeglass lens. As illustrated in FIG. 27, the display apparatus (image display unit) may be disposed so that the longitudinal direction of the eyepiece optical unit is vertical instead of being approximately horizontal. Adopting the arrangement illustrated in FIGS. 26 and 27 does not change the effects of this disclosure. Furthermore, the above reference examples may be combined.

The invention claimed is:

1. An eyeglass-type display apparatus comprising:
    an eyeglass-front having lenses to be placed in front of eyes of a user and a rim holding the lenses;
    left and right temples connected to the eyeglass-front and worn on a head of the user;
    an angle adjuster configured to adjust inclination of the eyeglass-front by rotating the eyeglass-front relative to the left and right temples; and
    an image display unit fixed to the eyeglass-front and including an eyepiece optical unit configured to project image light onto an eyeball of the user; wherein
    an axis of rotation of the angle adjuster is positioned on the eyeglass-front side of a center of the eyeball of the user as viewed from a side and the eyepiece optical unit is disposed along the rim on a side of the rim facing the user; and
    the angle adjustor performs alignment adjustment by rotating the image display unit and the eyeglass-front integrally relative to the left and right temples.

2. The eyeglass-type display apparatus of claim 1, wherein the axis of rotation of the angle adjuster is positioned near the image display unit as viewed from the side.

3. The eyeglass-type display apparatus of claim 1, wherein the left and right temples are configured to be expandable and contractible.

4. The eyeglass-type display apparatus of claim 1, further comprising
    a nose pad to abut a nose of the user; and
    a height position adjustment mechanism configured to adjust a height position of the nose pad relative to the eyeglass-front.

5. The eyeglass-type display apparatus of claim 1, wherein a distance between the axis of rotation and the eyepiece optical unit is smaller than half of the distance from the lens to the center of the eyeball of the user.

6. The eyeglass-type display apparatus of claim 5, wherein the distance between the axis of rotation and the eyepiece optical unit is smaller than 12 mm.

* * * * *